May 28, 1968  K. A. BRANDENBERG  3,385,323

MEMORY VALVE FOR FLUID LOGIC CIRCUITS

Filed July 8, 1966

INVENTOR
KARL A. BRANDENBERG

BY Bair, Freeman & Molinare
ATTORNEYS 3,385,323
MEMORY VALVE FOR FLUID LOGIC CIRCUITS
Karl A. Brandenberg, Hayward, Calif., assignor to
The Aro Corporation, Bryan, Ohio, a corporation
of Delaware
Filed July 8, 1966, Ser. No. 563,746
7 Claims. (Cl. 137—625.66)

This invention relates to a memory valve unit for a fluid logic circuit mechanism of the type shown in my copending application, Ser. No. 479,758, filed Aug. 16, 1965.

One object of my present invention is to provide a special type of valve unit designed for controlling fluid logic circuits powered with fluid pressure such as compressed air wherein the valve unit is particularly adapted for mounting on a "circuit board" which in turn is adapted to have a plurality of valve units mounted thereon and connected by means of the circuit board for forming various control and/or actuation duties in an assembly complex.

Another object is to provide a valve unit for fluid logic circuits which performs a "memory" function, the valve comprising a body having a pair of inlets, an outlet and an exhaust to atmosphere, together with an arrangement of operating parts such that one input is connected to a supply of fluid pressure, and the other inlet is adapted to receive a fluid pressure signal for setting the valve and to have the fluid pressure signal exhausted for resetting the valve.

Still another object is to provide the operating parts so designed that the outlet of the valve constitutes a pressure fluid output receiving fluid pressure from the supply inlet of the valve when the valve is set and exhausting the fluid pressure from the output when the valve is reset, signal pressure on the diaphragm being maintained through an orifice even though the set signal pressure to the input is only momentary, and even though the release of signal pressure has been completed.

A further object is to provide a design of valve in which the output from the supply is pressurized (ON). If the input signal pressure is discharged, a diaphragm is operated to open the output to exhaust and close off the supply. The output is therefore OFF or discharged.

Still a further object is to provide the body of the valve unit with a face adapted to be mounted on a fluid circuit board, the pair of inlets and the outlet terminating at this face for fluid connection with the board.

An additional object is to provide ring seals such as O-rings surrounding each of the inlets and the outlet and sealed against the circuit board, thus establishing fluid tight circuits relative thereto.

Another additional object is to provide the valve body formed of three parts for ready assembly, one part having a supply valve seat, a central part having an exhaust valve seat opposite the supply valve seat and a diaphragm chamber being provided between the second and third parts opposite the exhaust valve seat so that before the three parts are assembled together a valve disc may be interposed between the supply valve seat and the exhaust valve seat and an actuating diaphragm may be interposed between the second and third parts and operatively connected with the valve disc through an actuating stem.

Still another additional object is to provide ring seals between a central part and upper and lower parts of the valve body for a passageway extending from the central part into each of the other parts so that when the three parts are assembled there is no leakage of fluid pressure to atmosphere from the passageway between adjacent faces of the parts.

A further additional object is to provide a novel form of O-ring seal between the parts of the valve body which combines in a single element the seal for the parts relative to each other and the seal around a passageway where it extends from one part of the valve body into another part thereof.

With these and other objects in view, my invention consists in the construction, arrangement and combination of the various parts of my memory valve for fluid logic circuits, whereby the objects above contemplated are attained, as hereinafter more fully set forth, pointed out in my claims and illustrated in detail on the accompanying drawing, wherein:

FIG. 4 is an enlarged sectional view through one of the memory valves showing it mounted on a circuit board adjacent another memory valve in a manner similar to that disclosed in my copending application above referred to;

Figure 1:
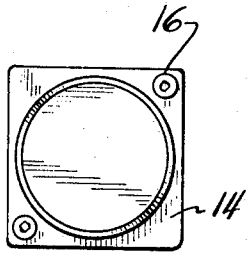
FIG. 1 is a plan view of a memory valve embodying my invention.
Figure 3:
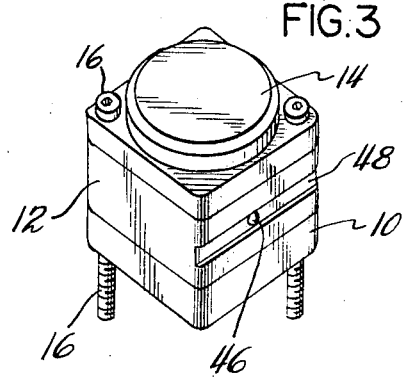
FIG. 3 is a perspective view thereof.
Figure 2:
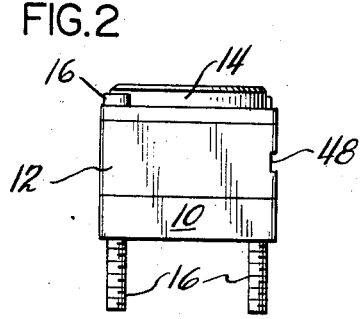
FIG. 2 is a side elevation thereof.
Figure 4:
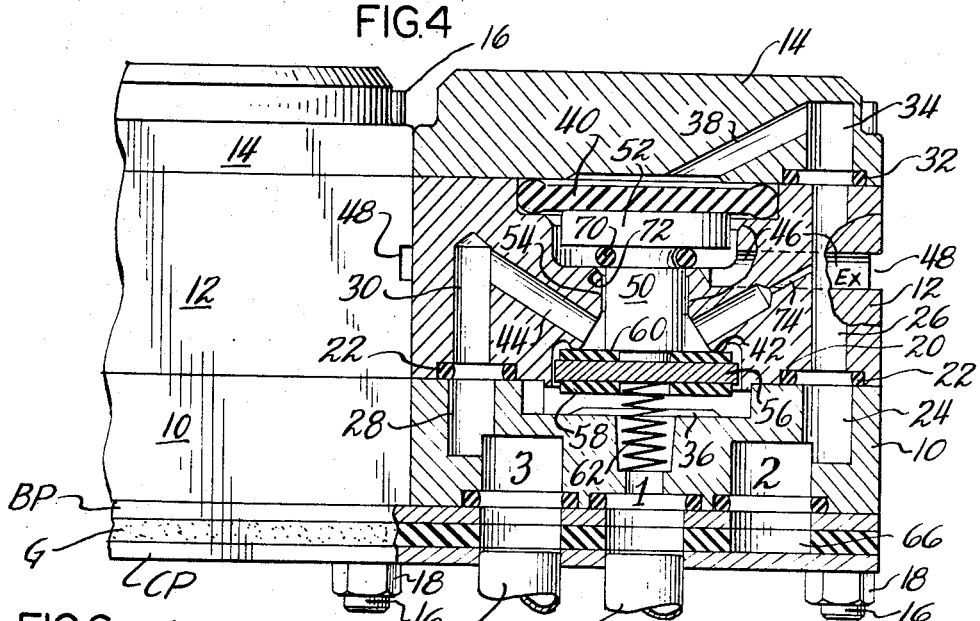
Figure 6:
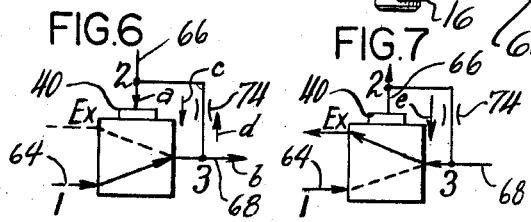
FIG. 6 is a fluid circuit diagram of a memory valve with the parts thereof in a set condition of operation.
Figure 7:
FIG. 7 is a fluid circuit diagram thereof with the parts in a reset condition of operation.

On the accompanying drawing I have used the reference characters BP to indicate a base plate, G a gasket and CP a cover plate of a circuit board such as disclosed in my copending application, and the numerals 1 and 2 for inlets, and 3 for an outlet in FIGS. 4, 6 and 7. The memory valve herein disclosed is in the form of a unit such as shown in FIGS. 1, 2 and 3, and includes a valve body formed of three parts 10, 12 and 14.

The parts 10, 12 and 14 may be suitably secured together in leakproof manner by clamping them together by means of screws 16 passing through suitable holes in the parts 12 and 14 and threaded through the part 10, the lower ends of the screws projecting so that the valve units can be mounted on the elements BP, G and CP as shown in FIG. 4 and held in position by nuts 18.

Figure 5:
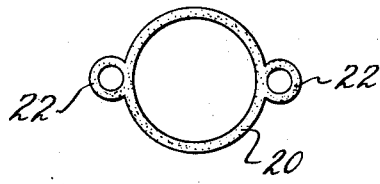
FIG. 5 is a plan view of a special type of O-ring seal at a scale of about half of FIG. 4.

In order to seal fluid circuits between the valve body parts 10 and 12, an O-ring 20 is provided and it is of special molded shape as shown in FIG. 5 with a pair of smaller O-ring elements 22 to seal around a passageway 24, 26, and 28, 30 as shown in FIG. 4 when the heads of screws 16 are properly tightened down against the part 14 by screwing them into the part 10. An O-ring 32 is shown for sealing around an extension passageway 34 of the passageway 26, the O-ring 32 sealing between the valve body parts 12 and 14 in an obvious manner.

The valve body part 10 includes the two inlets 1 and 2, and the outlet 3 as illustrated in FIG. 4, and the inlet 1 terminates in a stop seat 36. The inlet 2 and the passageways 24, 26 and 34 lead to a passageway 38 in the part 14 above a diaphragm 40. The valve body part 12 has an exhaust valve seat 42 communicating on one side with the outlet 3 through the passageway 28, 30 and a passageway 44, and on the other side with an exhaust passageway 46 leading to an exhaust groove 48.

A valve stem 50 has a head 52 engaging the lower surface of the diaphragm 40 and extends downwardly from the diaphragm through a bore 54 of the valve part 12 in which it is slidably mounted. The bore 54 is oversize relative to the stem 50 to permit the passage of fluid as will hereinafter appear. A valve disc 56 is operatively connected with the lower end of the stem 50 and has facing discs 58 and 60 for coaction at times with the stop seat 36 and the supply valve seat 42 respectively. A light spring 62 tends to keep the assembly of discs 56, 58 and 60 and the head 52 of the stem 50 up against the diaphragm 40 as shown in FIG. 4, this being the normal position when there is no input signal in the form of fluid pressure to the inlet 2 of the valve unit.

The inlet 1 is adapted for receiving fluid pressure as from a supply pipe 64, and the inlet 2 serves as a signal input adapted to receive fluid pressure from a passageway 66 in the gasket G whereas the outlet 3 serves as an output for fluid pressure supplied from the pipe 64. An outlet pipe is shown at 68 extending from the output 3.

PRACTICAL OPERATION

The operation of the valve unit disclosed is such that if the input 2 is ON (pressurized as indicated by arrow head *a* in FIG. 6), the diaphragm 40 forces the disc 60 off the seat 42 and the disc 58 (which serves as a buffer) against the stop seat 36 whereby fluid pressure is supplied from the pipe 64 through the inlet 1 past the disc 58 on the stop seat 36 and past the now open supply valve 42, 60, and through the passageways 44 and 30, 28 to the outlet 3 and the outlet pipe 68 to whatever other valve unit or the like is connected with the pipe 68. At the same time, an exhaust O-ring 70 carried by the valve stem 50 seats against an exhaust valve seat 72 to prevent the supplied pressure from exhausting to atmosphere. The output 3 is therefore ON (arrow head *b*) and the valve is "set." During the actuation of the valve, in addition to the flow of signal pressure from inlet 2 to the diaphragm 40 there is also flow through the restricted orifice 74 according to arrow *c* to outlet 3.

After flow of signal pressure to inlet 2 has stopped, reverse flow to the diaphragm may occur through orifice 74 according to arrow *d*. Pressure on top of the diaphragm is thus maintained through the orifice from the inlet 1 even though the input signal to input 2 may no longer be present. Accordingly, a surge of fluid pressure from the inlet 2 sets the valve in output (ON) condition and it is maintained in that condition by the continuance of pressure on the diaphragm through the orifice 74. The surge may be very short, only enough to fully set the valve.

Conversely, to reset the valve fluid pressure in the inlet 2 is discharged or bled to atmosphere whereupon the output 3 is then connected to exhaust (OFF) as the supply valve 42, 60 is closed and the exhaust valve 70, 72 is opened by removal of pressure from the top of the diaphragm 40 and by the expanding action of the spring 62. This position is also maintained if the bleed action is only momentary as once the O-ring 70 is cracked off the seat 72 and the supply valve 42, 60 is closed, the orifice 74 continues to bleed off the pressure from the top of the diaphragm into the valve body part 12 just above the supply valve seat 42, the same escaping by way of the bore 54 and passageway 46 to the groove 48. This condition is illustrated in FIG. 7 wherein the bleed of signal pressure from the inlet 2 after such momentary bleed would be through the orifice 74 in accordance with the arrow *e*.

From the foregoing specification it will be obvious that I have provided a comparatively simple valve unit adaptable for circuit board mounting which performs the memory function. This function is performed essentially by the orifice 74 as once a signal is given even momentarily, connection through the orifice to either pressure or exhaust in effect "remembers" the signal and maintains the condition it called for until an adverse signal is given. The valve involves a minimum number of parts and is very simple to assemble, and the mounting of the assembly on a circuit board can be accomplished with a minimum amount of effort.

Some changes may be made in the construction and arrangement of the parts of my memory valve for fluid logic circuits without departing from the real spirit and purpose of my invention, and it is my intention to cover by my claims any modified forms of structure or use of mechanical equivalents which may reasonably be included within their scope.

I claim as my invention:

1. A memory valve for fluid logic circuits comprising a valve body having a pair of inlets, an outlet and an exhaust passageway, a supply valve seat for said outlet, an exhaust valve seat for said exhaust passageway, said valve seats being opposed to each other, a supply valve for coaction with said supply valve seat, an exhaust valve for coaction with said exhaust valve seat, one of said valves being closed against its seat when the other is spaced from its seat and vice versa, a diaphragm for actuating said valves, said diaphragm being subject to a signal pressure from one of said inlets to open said supply valve and close said exhaust valve, the other of said inlets communicating through said supply valve seat with said outlet when said supply valve is open for pressurizing said outlet, the release of signal pressure from said one of said inlets effecting communication of said outlet with said exhaust valve seat and thereby permitting release of pressure from said outlet through said exhaust valve.

2. A memory valve for fluid logic circuits according to claim 1 wherein said diaphragm is also subject to pressure from said other of said inlets when said supply valve is spaced from said supply valve seat through a restricted orifice to maintain pressure on said diaphragm after a surge of signal pressure to said diaphragm from said one of said inlets, and to release pressure from said diaphragm after a surge of pressure release from said diaphragm through said one of said inlets.

3. A memory valve for fluid logic circuits according to claim 2 wherein said valve body has a face adapted to be mounted on a fluid circuit board, said pair of inlets and said outlet terminating at said face.

4. A memory valve for fluid logic circuits according to claim 3 wherein said valve body has a ring seal surrounding the end of each of said pair of inlets and said outlet adjacent said face, said ring seals being sealed against the adjacent face of said circuit board.

5. A memory valve for fluid logic circuits according to claim 2 wherein said valve body is formed in three parts, the first part having said inlets and said outlet, said diaphragm being mounted between the second and third parts, and all three parts having a passageway from said one of said inlets to said diaphragm to cause it to close said exhaust valve and open said supply valve upon said one of said inlets being pressurized.

6. A memory valve for fluid logic circuits according to claim 5 wherein said passageway extends from one part into another, and ring seals are provided between said parts to seal different portions of said passageway relative to each other.

7. A memory valve for fluid logic circuits according to claim 5 wherein said passageway from said one of said inlets to said diaphragm extends through two of said three body parts and into the third one, and ring seals are provided for the portions of said passageway extending into adjacent body parts.

References Cited

UNITED STATES PATENTS

| | | | |
|---|---|---|---|
| 3,107,693 | 10/1963 | Puster et al. | 137—625.66 |
| 3,316,938 | 5/1967 | Fedoseev et al. | 137—625.66 |
| 3,326,239 | 6/1967 | Saint-Joanis et al. | 137—625.66 |

HENRY T. KLINKSIEK, *Primary Examiner.*

R. J. MILLER, *Assistant Examiner.*